UNITED STATES PATENT OFFICE.

ALFRED BRACONNIER, OF NANCY, FRANCE.

PREPARATION OF MAGNESIA AND THE MANUFACTURE OF REFRACTORY BRICK THEREFROM.

SPECIFICATION forming part of Letters Patent No. 232,110, dated September 14, 1880.

Application filed July 1, 1880. (No model.) Patented in France March 18, 1880.

*To all whom it may concern:*

Be it known that I, ALFRED BRACONNIER, of Nancy, in the Republic of France, have invented a certain new and useful Improvement in the Preparation of Magnesia and the Manufacture of Refractory Brick Therefrom, of which the following is a specification.

The invention relates, first, to a method of preparing magnesia, and, secondly, to the manufacture of refractory bricks from the magnesia so prepared.

The magnesia is obtained in accordance with this invention by treating with calcined dolomite the liquid residues from industrial operations containing hydrochlorate of ammonia and metallic chlorides, with or without free hydrochloric acid—such, for example, as obtained in the manufacture of soda by the ammonia process. The dolomite is used in such quantities that the lime only enters into solution, while the magnesia remains undissolved and mixed with the foreign matter contained in the dolomite. The proportion of dolomite used depends, of course, upon the character of the liquid treated, and can be readily ascertained in any particular instance from the indications given. In this process the purity of the product depends solely on that of the original material. The advantage of it resides in its simplicity. It is not necessary to first dissolve the magnesia in order that it may be precipitated. Moreover, the loss of ammonia is reduced to a minimum, and the magnesia presents itself as an immediate residual product of manufacture, taking the place of the lime residue, which in soda-factories is, in fact, thrown out, and which it is very difficult to utilize.

In order to manufacture refractory bricks from magnesia thus prepared, it is dried and lightly calcined in a furnace constructed of magnesia bricks. After reduction to powder it is wet with a small quantity of water, so as to obtain a paste of the proper consistency. The desired form is then given by means of a mold to the bricks made from this paste, they being subjected to a compression as energetic as possible. The bricks are then dried very slowly. After desiccation the bricks are baked for at least twelve hours in furnaces of magnesia bricks provided with regenerators of heat and heated by gas to the highest temperature that can be obtained.

Having now fully explained the said invention and the manner of carrying the same into effect, what I claim, and desire to secure by Letters Patent, is—

1. The method of preparing magnesia by dissolving out the lime from the dolomite, leaving the magnesia undissolved.

2. The method of preparing magnesia from dolomite by treating liquids containing hydrochlorate of ammonia or metallic chlorides with calcined dolomite, in the proportions indicated.

3. The method of making refractory bricks by taking the undissolved residue remaining from dolomite after dissolving out the lime and forming bricks therefrom, as described.

BRACONNIER.

Witnesses:
LALIRE ADOLPH,
EUG. DUBOIS.